US011478751B2

United States Patent
Diel et al.

(10) Patent No.: US 11,478,751 B2
(45) Date of Patent: *Oct. 25, 2022

(54) AUTOMATED SINGLE-USE FILTERING APPARATUS, AND METHOD FOR CONTROLLING AN AUTOMATED SINGLE-USE FILTERING APPARATUS

(71) Applicant: SARTORIUS STEDIM BIOTECH GMBH, Goettingen (DE)

(72) Inventors: Bernhard Diel, Goettingen (DE); Maik Sommer, Goettingen (DE)

(73) Assignee: SARTORIUS STEDIM BIOTECH GMBH, Goettingen (DE)

(*) Notice: Subject to any disclaimer, the term of this patent is extended or adjusted under 35 U.S.C. 154(b) by 241 days.

This patent is subject to a terminal disclaimer.

(21) Appl. No.: 16/764,478

(22) PCT Filed: Oct. 11, 2018

(86) PCT No.: PCT/EP2018/077762
§ 371 (c)(1),
(2) Date: May 15, 2020

(87) PCT Pub. No.: WO2019/096502
PCT Pub. Date: May 23, 2019

(65) Prior Publication Data
US 2020/0353414 A1 Nov. 12, 2020

(30) Foreign Application Priority Data
Nov. 16, 2017 (DE) ..................... 10 2017 127 017.5

(51) Int. Cl.
*B01D 36/00* (2006.01)
*B01D 61/18* (2006.01)
(Continued)

(52) U.S. Cl.
CPC ............ *B01D 61/18* (2013.01); *B01D 61/22* (2013.01); *B01D 36/001* (2013.01); *B01D 61/20* (2013.01);
(Continued)

(58) Field of Classification Search
CPC ...... B01D 61/18; B01D 61/22; B01D 36/001; B01D 61/20; B01D 2313/18; B01D 65/08;
(Continued)

(56) References Cited

U.S. PATENT DOCUMENTS 8,789,407 B2    7/2014  Westner et al.
2005/0171501 A1  8/2005  Kelly
(Continued)

FOREIGN PATENT DOCUMENTS

CH      669533 A5    3/1989
CN     1843560 A    10/2006
(Continued)

OTHER PUBLICATIONS

International Search Report dated Jan. 2, 2019 in Application No. PCT/EP2018/077762, 3 pages.

*Primary Examiner* — Joseph W Drodge
(74) *Attorney, Agent, or Firm* — Dilworth IP, LLC

(57) ABSTRACT

An automated single-use filtration device, in particular for large-volume filtration processes, comprises an unfiltrate inlet, one or more filter elements, a filtrate outlet and sensors for detecting specific process parameters and regulating mechanisms for adjusting specific process parameters. The sensors and regulating mechanisms are connected to an external monitoring and control system, which is adapted for evaluating and processing sensor data and for piloting the regulating mechanisms based on one or more control algorithms.

14 Claims, 2 Drawing Sheets

(51) Int. Cl.
*B01D 61/20* (2006.01)
*B01D 61/22* (2006.01)

(52) U.S. Cl.
CPC ...... *B01D 2313/18* (2013.01); *B01D 2313/58* (2013.01)

(58) Field of Classification Search
CPC ................ B01D 65/10; B01D 2311/13; B01D 2311/14; B01D 2311/16; B01D 2311/165; B01D 2311/18; B01D 2313/44; B01D 2313/54; B01D 2313/58; B01D 2313/90; B01D 2317/04; B01D 2321/18; B01D 2321/185; C12M 47/10; C12M 47/12; C12M 47/16; C07K 1/34; C07K 1/36
See application file for complete search history.

(56) References Cited

U.S. PATENT DOCUMENTS

| | | | |
|---|---|---|---|
| 2009/0035856 A1* | 2/2009 | Galliher | C12M 29/10 |
| | | | 435/294.1 |
| 2010/0192686 A1 | 8/2010 | Kamen et al. | |
| 2011/0023588 A1 | 2/2011 | Westner et al. | |
| 2013/0211602 A1 | 8/2013 | Scheu et al. | |
| 2015/0323486 A1 | 11/2015 | Schick et al. | |
| 2017/0166468 A1* | 6/2017 | Gorrell | C02F 1/444 |
| 2018/0135006 A1* | 5/2018 | Maiser | B01D 61/142 |
| 2018/0155667 A1* | 6/2018 | Stobbe | C12M 23/28 |
| 2018/0238317 A1* | 8/2018 | Ward | B01D 61/20 |
| 2020/0224144 A1* | 7/2020 | Love | C12M 47/12 |
| 2020/0360859 A1* | 11/2020 | Loewe | B01D 36/001 |

FOREIGN PATENT DOCUMENTS

| | | |
|---|---|---|
| CN | 102698484 A | 10/2012 |
| DE | 102008018102 A1 | 10/2009 |
| DE | 102012202111 A1 | 8/2013 |
| DE | 202017103082 U1 | 6/2017 |
| EP | 0464322 A1 | 1/1992 |
| EP | 2119492 A1 | 11/2009 |
| EP | 3012012 A1 | 4/2016 |
| WO | 2007118235 A2 | 10/2007 |
| WO | 2012051517 A2 | 4/2012 |
| WO | 2016177650 A1 | 11/2016 |
| WO | 2017032560 A1 | 3/2017 |

* cited by examiner

AUTOMATED SINGLE-USE FILTERING APPARATUS, AND METHOD FOR CONTROLLING AN AUTOMATED SINGLE-USE FILTERING APPARATUS

The invention relates to an automated single-use filtration device which is particularly suitable for large-volume filtration processes. The invention further relates to a method of controlling such an automated single-use filtration device.

BACKGROUND OF THE INVENTION

In the field of single use technology development for biopharmaceutical applications, filtration elements are becoming increasingly popular and are now used on a broad scale. In recent years, for example, single-use filtration technologies have been continuously developed and are no longer used only in the field of laboratory and of process development. Rather, single-use filtration elements are now also commonly used in commercial manufacturing processes of pharmaceutical products for the clinical phases 1 to 3 (development stages in drug development) or also in the commercial production of such active substances. Single-use filtration devices currently available on the market are limited to smaller filter elements, which in turn are limited only to the pure functionality of "filtering".

Document WO 2017/032560 A1 shows a completely pre-sterilizable, integrity-testable single-use filtration device which is ready for connection and is designed for large-volume filtration processes. This single-use filtration device comprises a plurality of standard size single-use filter capsules arranged in a predetermined grid and connected to each other by lines. The filter capsules are supported by a rigid holder.

However, the issue as to the integration into automated processes has not been taken into account with previous single-use filtration elements. With the above-described entry of single-use filtration technology into commercial production, the need for automated filtration methods also increases in addition to pure scaling, i.e. the required filter size and thus the filtration area. This requires the embedding of filtration elements in hose lines, plastic tubing systems, single-use sensors and connection systems, which can then only form a holistic process solution by the connection to a suitable monitoring and control system.

SUMMARY OF THE INVENTION

In the field of single-use filtration technology, there is therefore a need for a single-use filtration device which is ready for connection and which permits a partially or fully automated filtration method, in particular on a large scale. The object of the invention is to satisfy this need.

This object is achieved by an automated single-use filtration device having the features of claim 1 and by a method of controlling an automated single-use filtration device having the features of claim 12. Advantageous and useful configurations of the device and the method according to the invention are specified in the corresponding subclaims.

The automated single-use filtration device according to the invention is provided in particular for large-volume filtration processes and comprises an unfiltrate inlet, one or more filter elements (in one or more filter units), a filtrate outlet and sensors for detecting specific process parameters and regulating means for adjusting specific process parameters. The sensors and regulating means are connected to an external monitoring and control system which is adapted for evaluating and processing sensor data and for piloting the regulating means based on one or more control algorithms.

The invention is based, among other things, on the findings that an automation of a filtration process using single-use components is of greater importance—compared to conventional reusable installations having stainless steel components—due to the significantly higher material-related risks. Therefore, in particular the process reliability is of even greater importance for single-use systems. An automation can reduce or even completely eliminate manual operating errors or misadjustments. If errors nevertheless occur or become imminent, this can be detected at an early stage. In addition, a considerable increase in efficiency can be achieved by the continuous determination, monitoring, supervision and adjustment of optimum process parameters. With the proposed single-use filtration device, it is possible to carry out a complete filtration process including all or at least some process steps in a partially or fully automatic manner using the monitoring and control system. A precondition therefor are the sensors and regulating means connected to the monitoring and control system for detecting, monitoring and, if necessary, regulating certain process-relevant parameters.

The sensors or regulating means connected to the monitoring and control system preferably comprise one or more of the following components, which are further preferably all designed as single-use components: a flow sensor arranged at the unfiltrate inlet; an inlet pressure sensor arranged at the unfiltrate inlet; an inlet regulating valve arranged at the unfiltrate inlet; an outlet liquid detector arranged at the filtrate outlet; an outlet regulating valve arranged at the filtrate outlet; and an outlet pressure sensor arranged at the filtrate outlet.

The automated single-use filtration device according to the invention preferably includes a sterile air filter connected to a venting outlet of the single-use filtration device. The sensors or regulating means then preferably also comprise a venting regulating valve inserted between the venting outlet and the sterile air filter and/or a venting liquid detector inserted between the venting outlet and the sterile air filter, these in turn being further preferably designed as single-use components.

Preferably, the regulating means further comprise an inlet-side feed pump, the delivery rate of which is adjustable. Further preferably, the delivery rate is adapted to be regulated (in an automated manner).

The invention also provides a method of controlling an automated single-use filtration device according to the invention, wherein the monitoring and control system performs at least one of the following process steps at least partially automatically:

filling the single-use filtration device with a wetting medium and complete venting via the sterile air filter;

rinsing and wetting the single-use filtration device or the filter element;

emptying and aerating the single-use filtration device by static draining or actively by emptying by pressing with a gaseous medium;

pre-use filter integrity test using a gaseous medium;

filling the single-use filtration device with a liquid product and complete venting;

filtering a liquid product under permanent supervision of the inlet pressure or outlet pressure and preferably of the flow rate;

filtering a liquid product under intermediate post-venting of the single-use filtration device if required;

expelling residual product liquid after completion of the filtration and rinsing with buffer or water or another liquid medium;

emptying and aerating the single-use filtration device by static draining or actively by emptying by pressing with a gaseous medium; and post-use filter integrity test with a gaseous medium.

Preferably, the process steps are carried out one after the other in the mentioned order within the scope of an overall process.

In the following, specific preferred monitoring and regulating procedures are specified which can be carried out in an advantageous manner fully or partially automatically within the scope of a filtration process during one or more of the above-mentioned process steps using the monitoring and control system and the sensors or regulating means connected thereto.

The filling of the single-use filtration device with wetting medium and/or product is carried out under continuous supervision of the pressure at the inlet pressure sensor by the monitoring and control system. The monitoring and control system regulates the performance of the feed pump such that a predetermined maximum pressure is not exceeded.

During venting and/or post-venting of the single-use filtration device via the sterile air filter, the venting regulating valve is opened by the monitoring and control system until the venting liquid detector detects liquid. The monitoring and control system then immediately closes the venting regulating valve.

During rinsing and wetting of the single-use filtration device or of the filter element, the monitoring and control system obtains information from the flow sensor at the unfiltrate inlet and regulates the performance of the feed pump based thereon. At the same time, the monitoring and control system continuously supervises the pressure at the inlet pressure sensor. A desired rinsing performance and desired pressure conditions are automatically adjusted and regulated by the monitoring and control system via the inlet regulating valve and/or the outlet regulating valve.

During rinsing and wetting of the single-use filtration device or of the filter element, the monitoring and control system regulates and/or clocks the venting regulating valve and the outlet regulating valve alternately, such that a controlled mixing and/or displacement of a liquid by another liquid takes place.

During emptying and aerating of the single-use filtration device by static draining or actively by emptying by pressing with air, the monitoring and control system opens the venting regulating valve and/or the outlet regulating valve to permit a flowing-off of the liquid.

During emptying and aerating of the single-use filtration device by static draining or actively by emptying by pressing with air, the monitoring and control system signalizes based on information from the outlet liquid detector that the emptying process is completed.

During the pre-use filter integrity test using a gaseous medium, the monitoring and control system pilots an external integrity test device which performs the integrity test itself. The monitoring and control system pilots the regulating valves via a closing body (drive) such that the inlet regulating valve is closed and the outlet regulating valve and the venting regulating valve are open.

During the filtration of a product and/or the expelling of residual product liquid after completion of the filtration and rinsing with buffer or water and/or during emptying and aerating of the single-use filtration device, the monitoring and control system continuously supervises the pressure at the inlet pressure sensor. Alternatively or additionally, the monitoring and control system obtains information from the flow sensor at the unfiltrate inlet. Based thereon, the monitoring and control system regulates the feed pump such that a specific filtration performance is achieved and/or a predetermined pressure is not exceeded.

In the event of an excessive pressure increase, the monitoring and control system throttles the feed pump or switches it off and/or closes the inlet regulating valve.

During expelling of residual product liquid after completion of the filtration, the monitoring and control system signalizes that the expelling process is completed based on information from the outlet liquid detector.

BRIEF DESCRIPTION OF THE DRAWINGS

Further features and advantages of the invention will become apparent from the description below and from the attached drawings to which reference is made and in which.

DETAILED DESCRIPTION OF THE INVENTION

Figure 1:
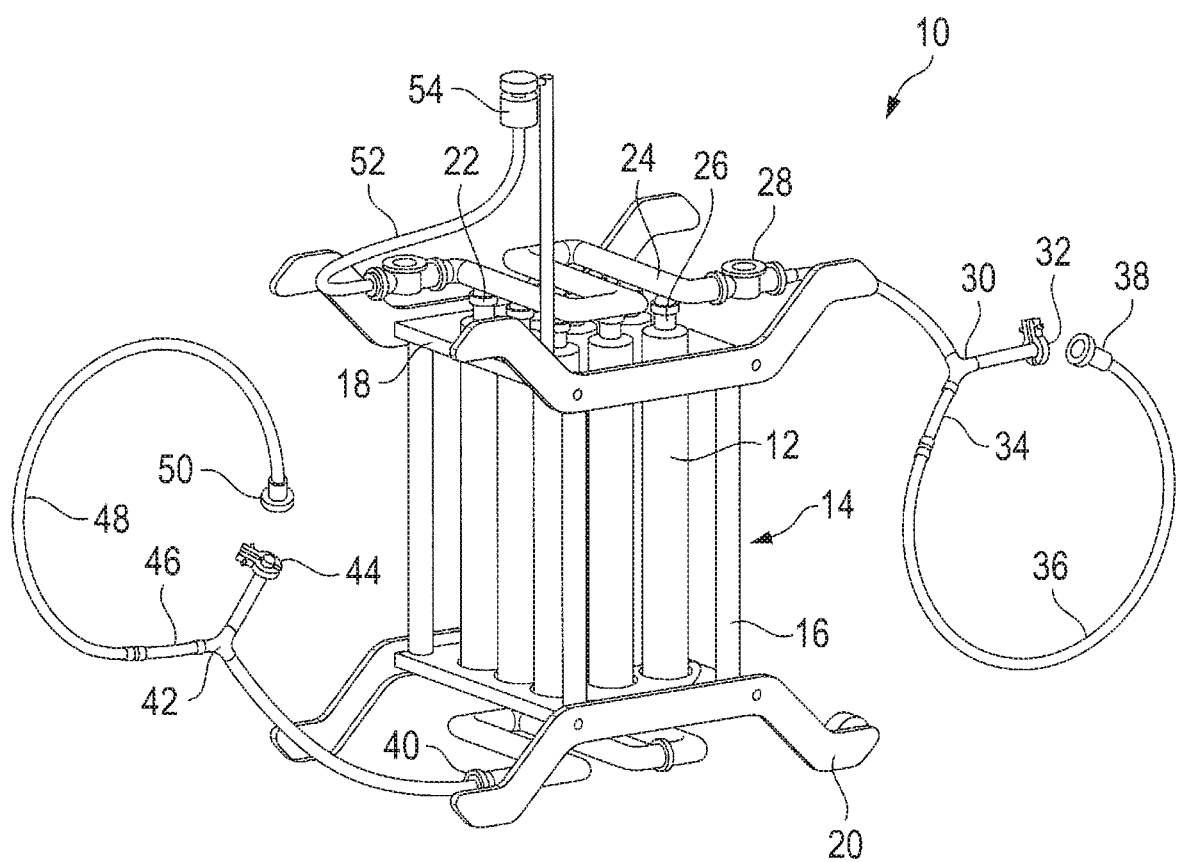
FIG. 1 shows a perspective view of a single-use filtration device with connecting pipes and other connecting elements.

FIG. 1 shows a single-use filtration device 10, which is similar to the device known from document WO 2017/032560 A1. A plurality of filter capsules 12 are held in position in a predetermined arrangement (grid) by a rigid holder 14. The term "filter capsule" is to be understood here in general terms and is intended to designate any independently mountable assembly having one or more filter elements (membranes) installed in one or more filter units. The holder 14 comprises support posts 16 which are connected to each other by cross struts 18. Pedestals 20 ensure a secure hold of the device 10. Holding means 22 are provided on the cross struts 18 for the individual filter capsules 12. The filter capsules 12 are completely or at least for the most part connected to each other by rigid, pressure-stable pipes 24. The concrete course of the pipes 24 shown here as an example is determined by the intended operation of the filtration device (parallel or series connection of the filter capsules 12), the pipes 24 having the necessary branchings 26 to the individual filter capsules 12. If necessary, the pipes 24 are fastened to the holder 14. The essential components of the rigid holder 14, the rigid housings of the filter capsules 12 and the rigid pipes 24 are all preferably made of the same material. This material and, if necessary, other materials used in the device 10 (e.g. for any flexible hose line) are adapted to be sterilized, in particular by gamma radiation, and autoclaved. The single-use filtration device 10 may thus be sterilized in a pre-assembled, i.e. ready-for-connection state and then packed, or may be packed and then sterilized. The single-use filtration device 10 is designed for a large-volume filtration process. In particular, the filter capsules 12 altogether provide a sufficiently large filtration area for such a process.

FIG. 1 shows by way of example lines, bifurcations and connections which may be provided for the integration of specific sensors and regulating means to automate the single-use filtration device 10. An intake valve 28 is connected to an unfiltrate inlet of the rigid single-use filtration device 10 via a hose part. A bifurcation 30 is provided upstream of the intake valve 28, a tri-clamp connection 32 being provided on one line branch thereof and a reinforced intermediate hose part 34 and an inlet hose line 36 connected thereto along with a first sterile connector 38 being provided on the other line branch thereof. A filtrate outlet of the rigid single-use filtration device 10 is connected to a discharge valve 40 via a hose part. Downstream of the discharge valve 40, provision is made for a bifurcation 42, a tri-clamp connection 44 being provided on one line branch thereof and a reinforced intermediate hose part 46 and an outlet hose line 48 connected thereto along with a second sterile connector 50 being provided on the other line branch thereof. A reinforced venting hose line 52 leads from a venting outlet of the single-use filtration device 10 to an air filter holding means which carries a sterile air filter 54.

Figure 2:
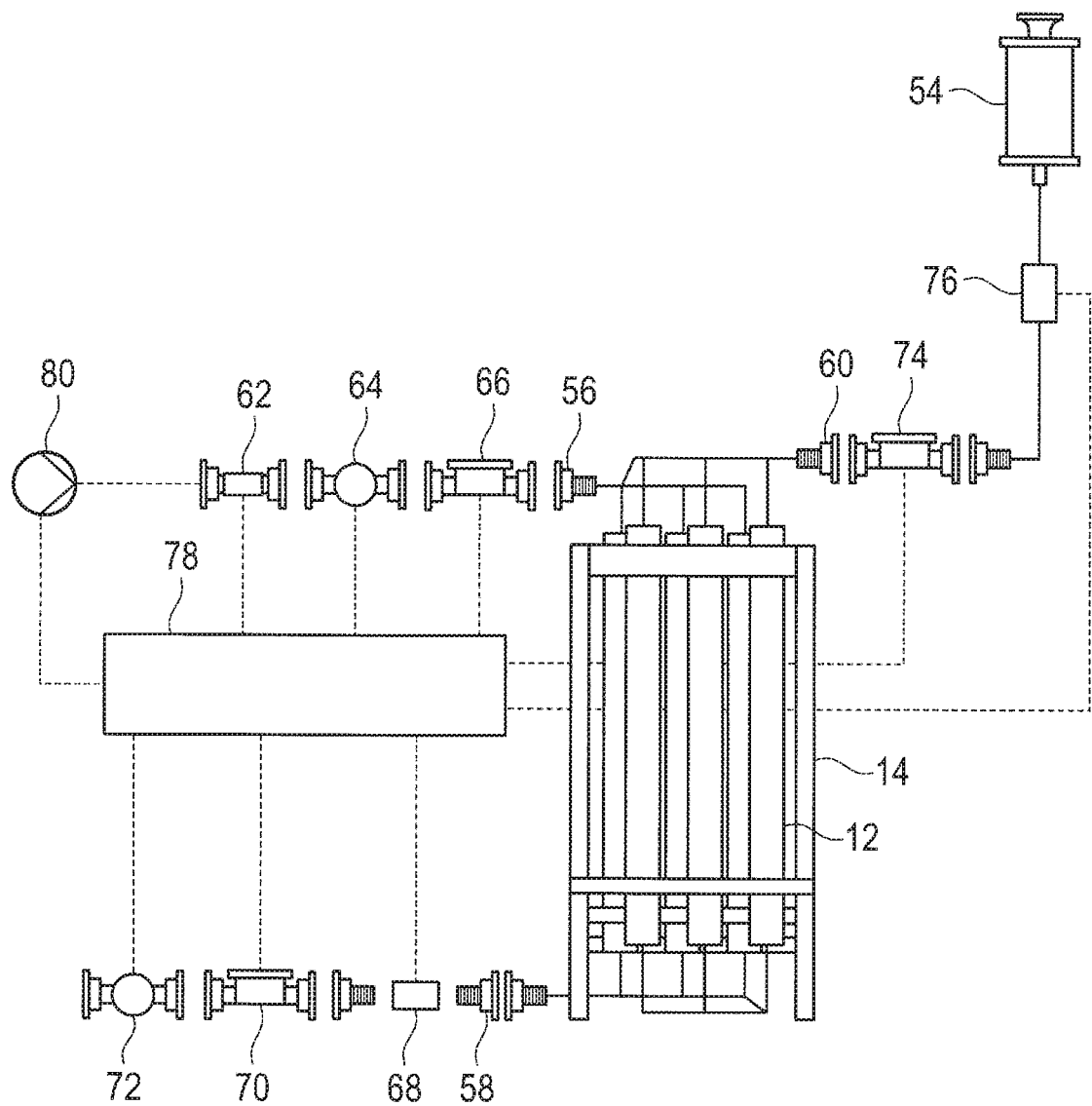
FIG. 2 shows a schematic lateral view of an automated single-use filtration device according to the invention.

The integration of sensors and regulating means for the automation of the single-use filtration device 10 is explained in more detail on the basis of the example configuration of a single-use filtration device 10 shown in FIG. 2. For the sake of clarity, the components and line branches are deliberately not all shown. As already mentioned, an unfiltrate inlet 56, a filtrate outlet 58 and a venting outlet (or air inlet) 60 of the single-use filtration device 10 are each provided with (if necessary additional) hose connections for the sensors and regulating means described below, which are all designed as single-use components.

A flow sensor 62 for determining the volume flowing through per time unit, an inlet pressure sensor 64 and an inlet regulating valve 66 are provided at the unfiltrate inlet 56. An outlet liquid detector 68, an outlet regulating valve 70 and an outlet pressure sensor 72 are provided at the filtrate outlet 58. A venting regulating valve 74 and a venting liquid detector 76 are provided at the venting outlet 60.

A precondition for a complete or partial (individual process steps) automation of the single-use filtration device 10 basically consists in that the integrated sensors and regulating means are connected to a monitoring and control system 78 via electrical lines and thus enable a control of the entire process or of the respective process step. The electrical lines serve on the one hand to actuate the sensors and regulating means and on the other hand, if provided, to transmit and/or receive data or signals required for the monitoring and/or control. Alternatively, the data or signals may also be transmitted by radio. The monitoring and control system 78 is not a single-use component, but an electronic system which is located remotely from the filter capsules 12 and which contains suitable software and hardware for the evaluation and processing of sensor data and for the piloting of the regulating means based on one or more control algorithms.

In the following, a filtration process which can be carried out using the single-use filtration device 10 and which is divided into the following fully or partially automated individual steps is described by way of example:

1) filling the single-use filtration device 10 with a wetting medium (for example water) and complete venting via the sterile air filter 54;

2) rinsing and wetting the entire single-use filtration device 10 or the filter element (filtration-effective layer);

3) emptying and aerating the single-use filtration device 10 by static draining or actively by emptying by pressing with air;

4) pre-use filter integrity test using a gaseous medium, for example air;

5) filling the single-use filtration device 10 with product and complete venting (process as in step 1);

6) filtering the product under permanent supervision and, if required, monitoring of the inlet pressure or outlet pressure;

7) filtering the product under intermediate post-venting if required;

8) expelling residual product liquid after completion of the filtration to reduce losses, and rinsing with buffer or water;

9) emptying and aerating the single-use filtration device 10 by static draining or actively by emptying by pressing with air (as in step 3); and 10) post-use filter integrity test with a gaseous medium, for example air (process as in step 4).

As to step 1: During the filling of the single-use filtration device 10 with a wetting medium (e.g. water) using a feed pump 80 and the complete venting via the sterile air filter 54, there are several possible errors which involve particularly high risks due to the single-use technology.

A first risk consists in that the filling rate could be too high, such that the air in the system does not have enough time to escape from the cavities and to rise upwards. In this case, air releases may occur in the later filtration process, which then accumulate as air bubbles in the upper part of the system and thus negatively affect the filtration area and thus the filtration efficiency.

The automatic control of this process step provides that the filling of the single-use filtration device 10 takes place while continuously measuring and monitoring the pressure at the inlet pressure sensor 64. In particular, the monitoring and control system 78 ensures that the feed pump 80 starts slowly at first to ensure a moderate filling process while not exceeding the maximum permissible pressure.

A second risk occurs mainly at the end of the filling process, when the operator of the single-use filtration device 10 does not recognize the moment at which the wetting medium reaches the upper level and enters the venting hose line 52, or recognizes it too late, so that the wetting medium enters the sterile air filter 54. In this case, there is a risk that the sterile air filter 54 is wetted and thus has no or only limited air permeability and can therefore no longer fulfil its actual intended function, namely to allow the air to escape from the system in a sterile state, or can fulfil this function only to a limited extent.

By using the venting regulating valve 74, followed by the venting liquid detector 76 at the outlet of the venting hose line 52, between the filter capsules 12 and the sterile air filter 54, a monitored and slow venting can initially be achieved by means of the monitoring and control system 78 by slightly opening the venting regulating valve 74. As soon as the liquid level reaches the upper part of the single-use filtration device 10 and the liquid enters the ascending venting hose line 52, the venting liquid detector 76 detects this, and the monitoring and control system 78 immediately sends a signal to the venting regulating valve 74, which is immediately closed before the liquid reaches the sterile air filter 54.

A third risk consists in that with manual pinch valves, it is quite possible that the operator activates the feed pump 80, but at that time a manually operated valve at the pump outlet is not or not fully open, or that the inlet hose line 36 is kinked at one point, which would very quickly cause overpressure in the hose system, which could lead to a bursting of the hose system or of a hose connection or cause a leak. Such a risk is to be taken into account in particular in view of the limited and often non-uniform pressure resistance of plastic hose sets and transfer or bag systems. Apart from the microbiological contamination risk, a leakage, depending on the product and the process step, may also represent a considerable health and economic risk.

Owing to the automatically controlled filling process, the speed of the feed pump 80 and thus the flow velocity can be monitored or controlled by means of the monitoring and control system 78. The inlet pressure sensor 64 can supervise the maximum permissible pressure of the single-use filtration device 10 and, if necessary, adjust the pump performance or also completely stop the feed pump 80 if, for example, a hose line is blocked and the maximum permissible pressure is therefore reached.

As to step 2: Also during rinsing and wetting of the entire single-use filtration device 10 or of the filter element (filtration-effective layer), errors can be made in the manual operation which, without the appropriate sensor technology, can only be avoided in a reasonably safe manner by means of other aids. The rinsing process serves to wash out unwanted components and to condition and thus prepare the filter elements in the filter capsules 12 for the following filtration process. The quantity of the rinsing medium on the one hand, and the flow velocity on the other hand, are important here.

A first risk in this process step consists in that the rinsing quantity in combination with the rinsing performance or even the recommended pressure conditions are not observed and thus the filter unit is not optimally rinsed and prepared. The manufacturers of the filter capsules 12 often specify how these process conditions should look like. In this process step, in addition to the flow rate, a specific pressure difference between the inlet and outlet pressure may for example be helpful or even necessary.

By means of the monitoring and control system 78 which obtains information from the flow sensor 62 at the unfiltrate inlet 56 of the single-use filtration device 10, the liquid flow can be monitored via the speed of the feed pump 80. At the same time, a desired rinsing performance can be adjusted and regulated by means of the inlet regulating valve 66 upon continuous measurement of the desired pressure conditions.

A second risk in this process step is attributed to the fact that upon transition from the wetting of the filters to filtration, the rinsing out and displacement of a medium (e.g. rinsing water) with another medium (e.g. product) can take a relatively long time and cause significant mixing phases due to the fluid dynamics within the single-use filtration device 10 due to structural conditions. On the one hand, this can lead to a high consumption of rinsing solution, on the other hand, the loss of product can also be very high, which constitutes an economic risk. In case of a manual operation, the user of a single-use filtration device 10 cannot monitor and reproducibly create the conditions necessary to avoid this risk.

Owing to the monitoring and control system 78, a precisely predefined, e.g. alternating cycling of the venting regulating valve 74 and of the outlet regulating valve 70 can be adjusted so as to achieve and ensure an optimum mixing or displacement of one liquid by another liquid under monitored conditions.

As to step 3: The emptying and aerating of the single-use filtration device 10 by static draining or actively by emptying by pressing with air requires a full opening of the venting regulating valve 74 and/or of the inlet regulating valve 66 to ensure that air can enter the single-use filtration device 10 and the liquid can flow off due to the gravity at the filtrate outlet 58 arranged at the bottom.

When performing this process step manually, the operator is not able to determine whether static draining is sufficient because he cannot visually check the liquid level within the single-use filtration device 10. If the regulating valves 74 and 66 arranged at the top are not or not sufficiently opened, the liquid can possibly not or not completely flow off, and the single-use filtration device 10 is not completely emptied.

For the automatic control of this process step, the outlet liquid detector 68 at the filtrate outlet 58 of the single-use filtration device 10 is involved. The outlet liquid detector 68 sends a signal to the monitoring and control system 78, which signalizes the operator that the emptying process is completed and that there is no residual liquid in the lower part of the single-use filtration device 10, although this may not be visible visually.

As to step 4: Before the intended filtration process, the filter elements are usually subjected to an integrity test with a gaseous medium, in particular air. The integrity test is carried out, for example, by completely shutting off the inlet regulating valve 66 via the venting outlet or air inlet 60. The inlet side of the single-use filtration device 10 is subjected to a defined test pressure generated by an externally connected integration test device in order to subsequently check whether or how long this test pressure can be maintained. This period of time allows conclusions to be drawn about the integrity of the filter membranes.

If this process step is performed manually, there is a risk that the operator of the single-use filtration device 10 has not closed the inlet regulating valve 66 or has not closed it in a sufficiently tight manner, so that small amounts of air can escape during the test phase and affect the test result. This would lead to an incorrect test result, so that the integrity test and possibly the entire rinsing step before the integrity test would have to be repeated again. This would mean a considerable additional expenditure of time.

The monitoring and control system 78 permits the automatic and reliable closing of the inlet regulating valve 66 (as well as of the further regulating valves 70, 74) using an electric or pneumatic drive which closes a closing body over a predefined path and under a defined and monitored force. The risk of an incomplete or insufficient closure of the inlet regulating valve 66 by the operator is therefore eliminated.

As to step 5: The risks involved in the filling of the single-use filtration device 10 with product and the complete venting correspond to those already described in connection with step 1. Therefore, concerning the avoidance or minimization of these risks, reference is made to the explanations given there.

As to step 6: The filtration of the product under permanent supervision and, if necessary, monitoring of the inlet pressure or outlet pressure should generally be carried out under constant flow conditions.

Usually, a single-use filtration device 10 has a limited performance depending on the filter area and the product. This means that after a specific amount of filtration, the pores of the filter gradually begin to clog, which, at a constant flow, leads to an increase in the inlet pressure. However, the latter is limited due to the pressure limitation of the single-use filtration device 10 and must not be exceeded in order to avoid a bursting of the single-use filtration device 10 or a leakage. In the manual process, the pressure must therefore be permanently supervised and monitored by the operator.

The automated single-use filtration device 10, which is equipped with the inlet pressure sensor 64 at the unfiltrate inlet 56, permits to ensure a continuous and complete pressure supervision by means of the monitoring and control system 78. If the case of a pressure increase occurs, a critical overpressure situation can be avoided by throttling or switching off the feed pump 80 and/or by closing the inlet regulating valve 66.

As to step 7: The filtration of the product with intermediate post-venting if necessary is also susceptible to errors when performed manually. On the one hand, it is important to observe the correct filtration pressure, on the other hand, specific flow velocities must not be exceeded, for example to protect the product from excessive shear forces or to prevent premature blocking. Furthermore, during post-venting, there is a risk that the sterile air filter 54 is wetted in case of an incorrect handling, and the function thereof is thus impaired.

By means of the monitoring and control system 78 which obtains information from the flow sensor 62 at the unfiltrate inlet 56 of the single-use filtration device 10, a desired filtration performance can be adjusted and regulated via the speed of the feed pump 80. It is thus ensured that the predetermined process parameters are observed at the best to achieve that the entire filtration process runs as evenly as possible and in a manner preserving the product at the best.

A further risk during filtration arises towards the end of the filtration process. The pressure in the system can rise to a critical level if the filters block, so that there is a risk of bursting, in particular for the hose lines. The risk of bursting can be further increased by improper handling.

The monitoring and control system 78 can reliably detect a blocking of the filters by the constant pressure and flow supervision. The system can be switched off by an appropriate regulation of the speed of the feed pump 80 and of the inlet regulating valve 66, if the filters are blocked.

During filtration, air or gas can slowly accumulate in the filter unit due to release from the liquid medium or due to the process conditions and can really be trapped in the filter unit. This can even lead to the liquid level in the filter unit dropping and the upper part of the filter elements themselves no longer being effective for filtration. This reduces the effective filtration area and thus also the filter capacity, which constitutes an economic risk. The monitoring and control system 78 can automatically initiate intermediate post-venting steps to counteract this risk by constantly supervising the liquid level by means of the venting liquid detector 76.

During the post-venting process itself, there is also the risk that medium can penetrate the venting hose line 52 up to the sterile air filter 54 and then wet the sterile air filter 54. A venting of the system is then only possible to a limited extent and maybe no longer possible at all.

By using the venting regulating valve 74, followed by the venting liquid detector 76 at the outlet of the venting hose line 52, between the filter capsules 12 and the sterile air filter 54, a monitored and slow venting can initially be carried out using the monitoring and control system 78 by slightly opening the venting regulating valve 74. As soon as the liquid level reaches the upper part of the single-use filtration device 10 and the liquid enters the ascending venting hose line 52, the venting liquid detector 76 detects this, and the monitoring and control system 78 immediately sends a signal to the venting regulating valve 74, which is immediately closed before the liquid reaches the sterile air filter 54.

As to step 8: During expelling of residual product liquid after completion of the filtration and rinsing with buffer or water, there is a risk, among others, that the pressure in the system will rise to a high level after the residual product liquid has been successfully expelled, as the wetted filters are not permeable to air.

By integrating the inlet pressure sensor 64, the monitoring and control system 78 can throttle the performance of the feed pump 80 at an early stage and switch it off if necessary, in case the pressure becomes too high. It is also possible to regulate the pressure via the venting regulating valve 74. At the same time, an efficient use of the residual product liquid can be ensured via the outlet liquid detector 68 at the filtrate outlet 58, as the system detects when the entire residual liquid has been expelled, i.e. no further liquid is expelled.

During the subsequent rinsing, the system must be vented again, again with the risk of a wetting of the sterile air filter 54. A venting of the system is then only possible to a limited extent, maybe no longer possible at all.

By using the venting regulating valve 74, followed by the venting liquid detector 76 at the outlet of the venting hose line 52, between the filter capsules 12 and the sterile air filter 54, a monitored and slow venting can initially be carried out using the monitoring and control system 78 by slightly opening the venting regulating valve 74. As soon as the liquid level reaches the upper part of the single-use filtration device 10 and the liquid enters the ascending venting hose line 52, the venting liquid detector 76 detects this, and the monitoring and control system 78 immediately sends a signal to the venting regulating valve 74, which is immediately closed before the liquid reaches the sterile air filter 54.

As to step 9: During emptying and aerating of the single-use filtration device by static draining or actively by emptying by pressing with air, there is the risk that the system cannot reliably be drained in a static manner if the venting regulating valve 74 and/or the inlet regulating valve 66 are not open. It is in principle difficult to determine the current draining degree of the system, as it is not readily apparent to the operator how much residual fluid is left in the system.

For the automatic control of this process step, the venting regulating valve 74 and/or the inlet regulating valve 66 and the outlet liquid detector 68 at the filtrate outlet 58 of the single-use filtration device 10 are involved. The venting regulating valve 74 and/or the inlet regulating valve 66 are automatically opened, and the outlet liquid detector 68 can reliably detect whether the single-use filtration device 10 has been completely statically emptied. Furthermore, the outlet liquid detector 68 can detect the successful completion of the emptying process and complete the process step.

If the system is actively emptied by pressing with air via the inlet line, there is the risk of a considerable pressure increase after the successful expelling of the liquid, as the wetted membrane is impermeable to air. To avoid the risk of a bursting, the pressure is continuously supervised by means of the inlet pressure sensor 64 at the unfiltrate inlet 56 and the monitoring and control system 78. If the case of a pressure increase occurs, a critical overpressure situation can be avoided by throttling or switching off the feed pump 80 or by closing the inlet regulating valve 66.

Of course, additional and/or further sensors and regulating means different from those explained above may be provided for the (partially) automated execution of the above explained and/or of additional or different processes or process steps.

LIST OF REFERENCE NUMERALS 10 single-use filtration device
12 filter capsule
14 holder
16 support post
18 cross strut
20 pedestal 22 holding means
24 pipe
26 branch
28 intake valve
30 bifurcation
32 tri-clamp-connection
34 intermediate hose part
36 inlet hose line
38 first sterile connector
40 discharge valve
42 bifurcation
44 tri-clamp-connection
46 intermediate hose part
48 outlet hose line
50 second sterile connector
52 venting hose line
54 sterile air filter
56 unfiltrate inlet
58 filtrate outlet
60 venting outlet
62 flow sensor
64 inlet pressure sensor
66 inlet regulating valve
68 outlet liquid detector
70 outlet regulating valve
72 outlet pressure sensor
74 venting regulating valve
76 venting liquid detector
78 monitoring and control system
80 feed pump

The invention claimed is:

1. An automated single-use filtration device, comprising:
one or more filter elements,
an unfiltrate inlet to the one or more filter elements,
a filtrate outlet from the one or more filter elements,
a sterile air filter connected to a venting outlet of the single-use filtration device,
sensors for detecting specific process parameters, the sensors including a flow sensor and an inlet pressure sensor arranged at the unfiltrate inlet, an outlet liquid detector, an outlet pressure sensor, and an outlet regulating valve arranged at the filtrate outlet, and a venting liquid detector between the sterile air filter and the venting outlet, and
regulating mechanisms for adjusting the specific process parameters, the regulating mechanisms including an inlet regulating valve arranged at the unfiltrate inlet,
wherein the sensors and regulating mechanisms are connected to an external monitoring and control system which is adapted for evaluating and processing sensor data and for controlling the regulating mechanisms based on one or more control algorithms.

2. The single-use filtration device according to claim 1, wherein the regulating mechanisms further comprise a venting regulating valve inserted between the venting outlet and the sterile air filter.

3. The single-use filtration device according to claim 1, wherein the regulating mechanisms further comprise an inlet feed pump delivering fluid to the unfiltrate inlet at an adjustable delivery rate.

4. A method of controlling the automated single-use filtration device according to claim 1, wherein the monitoring and control system performs, at least partially automatically, at least one of the following process steps:
filling the single-use filtration device with a wetting medium and venting air via the sterile air filter;
rinsing and wetting the one or more filter elements;
emptying and aerating the single-use filtration device by static draining or actively emptying the device by pressing with a gaseous medium;
conducting a filter integrity test using a gaseous medium;
filling the single-use filtration device with a liquid and venting via the sterile air filter;
filtering a liquid under continuous monitoring of the inlet pressure sensor, outlet pressure sensor and/or a flow rate;
filtering a liquid after venting of the single-use filtration device if required; and
expelling residual product liquid after completion of a filtration and rinsing with buffer, or water or another liquid medium.

5. The method according to claim 4, wherein comprising filling of the single-use filtration device with wetting medium and/or liquid is carried out under continuous monitoring of pressure at the inlet pressure sensor by the monitoring and control system, wherein the monitoring and control system regulates the performance of a feed pump such that a predetermined maximum pressure is not exceeded.

6. The method according to claim 4, wherein the regulating mechanisms comprise a venting regulating valve inserted between the venting outlet and the sterile air filter, and comprising configuring the monitoring and control system such that wherein, during the emptying and aerating of the single-use filtration device by static draining or actively emptying the device by pressing with air, the monitoring and control system opens the venting regulating valve and/or the outlet regulating valve.

7. The method according to claim 6, wherein, comprising configuring the monitoring and control system such that during the emptying and aerating of the single-use filtration device by static draining or actively emptying by pressing the device with air, the monitoring and control system signalizes based on information from the outlet liquid detector that the emptying process is completed.

8. The method according to claim 4, wherein the regulating mechanisms comprise a venting regulating valve inserted between the venting outlet and the sterile air filter, and comprising configuring the monitoring and control system such that wherein, during the filter integrity test using a gaseous medium, the monitoring and control system controls an external integrity test device which performs the integrity test itself, the monitoring and control system controlling the regulating valves via a closing body (drive) such that the inlet regulating valve is closed and the outlet regulating valve and the venting regulating valve are open.

9. The method according to claim 4, comprising configuring the monitoring and control system such that wherein, during filtration of a product and/or expelling of residual product liquid after completion of a filtration and rinsing with buffer, or water and/or during emptying and aerating of the single-use filtration device, the monitoring and control system continuously monitors the pressure at the inlet pressure sensor and/or obtains information from the flow sensor at the unfiltrate inlet, and in that the monitoring and control system regulates a feed pump based thereon, such that a specific filtration performance is achieved and/or a predetermined pressure is not exceeded.

10. The method according to claim 9, comprising configuring the monitoring and control system such that wherein, the monitoring and control system throttles or switches off the feed pump and/or closes the inlet regulating valve in the event of an excessive pressure increase.

11. The method according to claim 4, comprising configuring the monitoring and control system such that wherein, during expelling of residual product liquid after completion of a filtration, the monitoring and control system signalizes that the expelling process is completed based on information from the outlet liquid detector.

12. A method of controlling an automated single-use filtration device,
wherein the automated single-use filtration device includes one or more filter elements, an unfiltrate inlet to the one or more filter elements, a filtrate outlet from the one or more filter elements, a sterile air filter connected to a venting outlet of the single-use filtration device, sensors for detecting specific process parameters, the sensors including a flow sensor and an inlet pressure sensor arranged at the unfiltrate inlet, and an outlet liquid detector, an outlet pressure sensor, and an outlet regulating valve arranged at the filtrate outlet, and regulating mechanisms for adjusting the specific process parameters, the regulating mechanisms including an inlet regulating valve arranged at the unfiltrate inlet, wherein the sensors and regulating mechanisms are connected to an external monitoring and control system which is adapted for evaluating and processing sensor data and for controlling the regulating mechanisms based on one or more control algorithms,
by configuring the monitoring and control system for performing, at least partially automatically, at least one of the following process steps:
filling the single-use filtration device with a wetting medium and venting the device via the sterile air filter, and
filling the single-use filtration device with a liquid and venting the device via the sterile air filter,
wherein, during and/or after the venting of the single-use filtration device via the sterile air filter, a venting regulating valve inserted between the venting outlet and the sterile air filter is opened by the monitoring and control system until a venting liquid detector detects liquid, and in that the monitoring and control system then immediately closes the venting regulating valve.

13. A method of controlling an automated single-use filtration device,
wherein the automated single-use filtration device includes one or more filter elements, an unfiltrate inlet to the one or more filter elements, a filtrate outlet from the one or more filter elements, a sterile air filter connected to a venting outlet of the single-use filtration device, sensors for detecting specific process parameters, the sensors including a flow sensor and an inlet pressure sensor arranged at the unfiltrate inlet, and an outlet liquid detector, an outlet pressure sensor, and an outlet regulating valve arranged at the filtrate outlet, and regulating mechanisms for adjusting the specific process parameters, the regulating mechanisms including an inlet regulating valve arranged at the unfiltrate inlet, wherein the sensors and regulating mechanisms are connected to an external monitoring and control system which is adapted for evaluating and processing sensor data and for controlling the regulating mechanisms based on one or more control algorithms,
by configuring the monitoring and control system for performing, at least partially automatically, the following process step:
rinsing and wetting the one or more filter elements,
wherein, during the rinsing and wetting of the one or more filter elements, the monitoring and control system obtains information from the flow sensor at the unfiltrate inlet and regulates the performance of a feed pump based thereon, wherein the monitoring and control system simultaneously and continuously monitors pressure at the inlet pressure sensor and adjusts and regulates the rinsing and the pressure via the inlet regulating valve and/or the outlet regulating valve.

14. The method according to claim 13, wherein the regulating mechanisms comprise a venting regulating valve inserted between the venting outlet and the sterile air filter, and wherein, during the rinsing and wetting of the one or more filter elements, and comprising configuring the monitoring and control system such that the system alternately regulates and/or clocks the venting regulating valve and the outlet regulating valve such that a monitored mixing and/or displacement of a liquid by another liquid takes place.

* * * * *